A. LEWIS.
Harrow.
No. 107,269.
Patented Sept. 13, 1870.
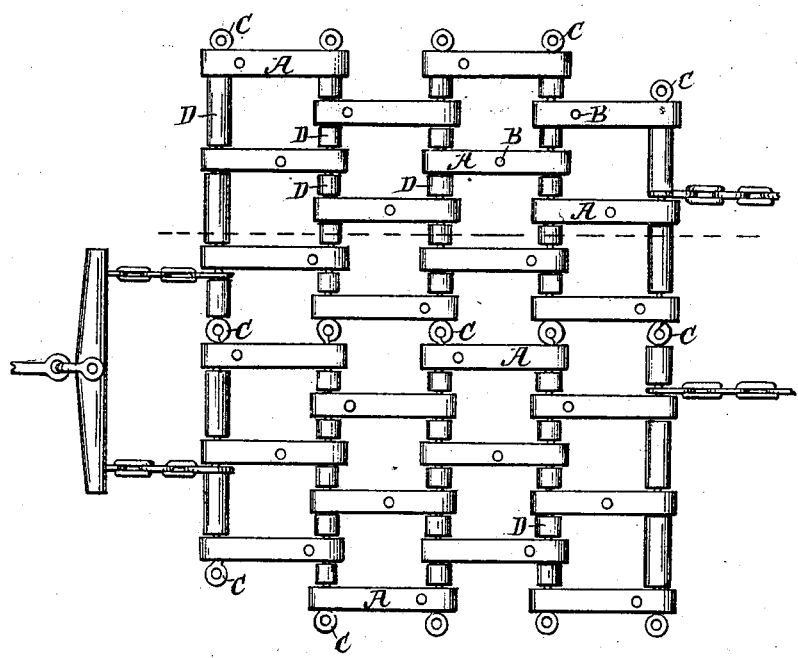
Witnesses.
E. Wolff
L. S. Mabee
Inventor.
Andrew Lewis
PER Munn & Co
Attorneys

United States Patent Office.

ANDREW LEWIS, OF HASTINGS, MINNESOTA.

Letters Patent No. 107,269, dated September 13, 1870.

IMPROVEMENT IN HARROWS.

The Schedule referred to in these Letters Patent and making part of the same.

*To all whom it may concern:*

Be it known that I, ANDREW LEWIS, of Hastings, in the county of Dakota and State of Minnesota, have invented a new and useful Improvement in Harrows; and I do hereby declare that the following is a full, clear, and exact description thereof, which will enable others skilled in the art to make and use the same, reference being had to the accompanying drawing forming part of this specification, in which—

Figure 1 is a side view of my improved harrow.
Figure 2 is a top view of the same.
Similar letters of reference indicate corresponding parts.

My invention has for its object to furnish an improved harrow, which shall be flexible, so as to adapt itself to any uneveness of ground, and which may be folded together, to enable it to make a turn on short corners; and It consists in the harrow constructed as hereinafter more fully described.

The frame of the harrow is formed of a number of rows of short parallel bars, A, to which the teeth, B, are attached, and the ends of which overlap each other, as shown in fig. 2.

C are rods that pass through the overlapped ends of the bars A, and which are jointed at their middle parts, as shown in fig. 2. The ends of the bars A are kept in their proper relative positions upon the rods C by tubular washers, D, placed upon the said rods C between the said bars A, as shown in fig. 2.

The bars A are so arranged that the bars of each succeeding row may be midway between the bars of the preceding row, as show in fig. 2. The draft may be attached to either end of the harrow, as may be desired.

By this construction the harrow will be flexible, so that it may adjust itself to the surface of the ground, however uneven said surface may be. The rear part of the harrow may be turned or folded over the forward part, for convenience in making short turns.

Having thus described my invention,

I claim as new and desire to secure by Letters Patent—

An improved harrow, formed by the combination of the short bars A, to which the teeth B are attached, and which are arranged in parallel rows, connecting-rods C, jointed in their middle parts, and tubular washers D, with each other, substantially as herein shown and described, and for the purposes set forth.

ANDREW + LEWIS.
his mark.

Witnesses:
C. W. CROSBY,
JOHN F. NEWTON.